US012346672B2

(12) United States Patent
Inaba et al.

(10) Patent No.: US 12,346,672 B2
(45) Date of Patent: Jul. 1, 2025

(54) ROBOT PROGRAMMING DEVICE

(71) Applicant: FANUC CORPORATION, Yamanashi (JP)

(72) Inventors: Gou Inaba, Yamanashi (JP); Tomoyuki Yamamoto, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 99 days.

(21) Appl. No.: 17/928,387

(22) PCT Filed: Jun. 1, 2020

(86) PCT No.: PCT/JP2020/021601
§ 371 (c)(1),
(2) Date: Nov. 29, 2022

(87) PCT Pub. No.: WO2021/245746
PCT Pub. Date: Dec. 9, 2021

(65) Prior Publication Data
US 2023/0099469 A1    Mar. 30, 2023

(51) Int. Cl.
*G06F 9/44* (2018.01)
*B25J 9/16* (2006.01)
*G06F 8/34* (2018.01)

(52) U.S. Cl.
CPC .............. *G06F 8/34* (2013.01); *B25J 9/1664* (2013.01)

(58) Field of Classification Search
CPC .................................. G06F 8/34; B25J 9/1664
See application file for complete search history.

(56) References Cited

U.S. PATENT DOCUMENTS

| 5,841,959 A * | 11/1998 | Guiremand | G01N 35/0092 345/440 |
| 10,942,712 B2 * | 3/2021 | Laethem | G06F 8/34 |
| 2005/0102066 A1 * | 5/2005 | Watanabe | B25J 13/003 704/E15.045 |
| 2007/0150102 A1 * | 6/2007 | Park | G06F 8/34 700/245 |

(Continued)

FOREIGN PATENT DOCUMENTS

| CN | 110497412 A | 11/2019 |
| EP | 3550348 A1 | 10/2019 |

(Continued)

OTHER PUBLICATIONS

International Search Report mailed Aug. 18, 2020, in International Patent Application No. PCT/JP2020/021601, 5 pages.

(Continued)

*Primary Examiner* — Qamrun Nahar
(74) *Attorney, Agent, or Firm* — Maier & Maier, PLLC

(57) ABSTRACT

A robot programming device including a storage unit configured to store two or more types of programming elements each graphically representing a function constituting a control program for a robot, an input unit configured to receive an operation by a user, and a program generator configured to generate the control program when the programming elements stored in the storage unit are selected and arranged by using the input unit. The programming elements include at least one editable programming element in which the function can be edited with a character string input that is input by using the input unit.

7 Claims, 10 Drawing Sheets

(56) References Cited

U.S. PATENT DOCUMENTS

| | | | | |
|---|---|---|---|---|
| 2007/0277116 | A1* | 11/2007 | Nakajima | G06F 8/38 |
| | | | | 715/769 |
| 2018/0154517 | A1* | 6/2018 | Park | B25J 9/161 |
| 2019/0312072 | A1 | 10/2019 | Cho et al. | |
| 2020/0167072 | A1* | 5/2020 | MacKay | G06F 3/0488 |

FOREIGN PATENT DOCUMENTS

| | | | |
|---|---|---|---|
| JP | H04507022 | A | 12/1992 |
| JP | H08101115 | A | 4/1996 |
| JP | H8190417 | A | 7/1996 |
| JP | H08249026 | A | 9/1996 |
| JP | 3136055 | B | 2/2001 |
| JP | 2001353678 | A | 12/2001 |
| JP | 2003067007 | A | 3/2003 |
| JP | 2007317032 | A | 12/2007 |
| JP | 4657149 | B | 3/2011 |
| JP | 201167943 | A | 4/2011 |
| JP | 2012528015 | A | 11/2012 |
| JP | 201325727 | A | 2/2013 |
| JP | 2014144523 | A | 8/2014 |
| JP | 6498366 | B | 4/2019 |
| JP | 2019186544 | A | 10/2019 |
| JP | 2021030397 | A | 3/2021 |
| WO | 9106050 | A | 5/1991 |
| WO | 2020012558 | A1 | 1/2020 |

OTHER PUBLICATIONS

Mitsunaga et al., "aiBlocks: A Visual Programming Environment on a Tablet PC to Write a Micro Controller's Program", Information Processing Society of Japan, Feb. 22, 2017, vol. 3, No. 1, pp. 53-63, with partial English translation.

Office Action issued on Nov. 19, 2024, in corresponding Japanese Application No. 2022-529146, 6 pages.

* cited by examiner

ROBOT PROGRAMMING DEVICE

TECHNICAL FIELD

The present disclosure relates to a robot programming device.

BACKGROUND

In a known robot programming device, icons representing functions constituting a control program for a robot are arranged in combination with one another (for example, see Japanese Patent No. 6498366).

SUMMARY

An aspect of the present disclosure is a robot programming device including: a storage unit configured to store two or more types of programming elements each graphically representing a function constituting a control program for a robot; an input unit configured to receive an operation by a user; and a program generator configured to generate the control program when the programming elements stored in the storage unit are selected and arranged by using the input unit, wherein the programming elements include at least one editable programming element in which the function can be edited with a character string input that is input by using the input unit.

DETAILED DESCRIPTION OF THE EMBODIMENTS

While a program composed of a combination of icons is easy to understand for beginners, it is difficult to create an advanced program. The reasons for this are that the icons support a small number of commands, that it is difficult to simply and graphically express advanced commands, that combining a large number of easy commands makes the program complex, and so forth.

Accordingly, it is desirable to enable a user to create a program including advanced commands of an easy programming that uses graphical programming elements, such as icons.

An aspect of the present disclosure is a robot programming device including: a storage unit configured to store two or more types of programming elements each graphically representing a function constituting a control program for a robot; an input unit configured to receive an operation by a user; and a program generator configured to generate the control program when the programming elements stored in the storage unit are selected and arranged by using the input unit, wherein the programming elements include at least one editable programming element in which the function can be edited with a character string input that is input by using the input unit.

A robot programming device 1 according to an embodiment of the present disclosure will be described below with reference to the drawings.

Figure 1:
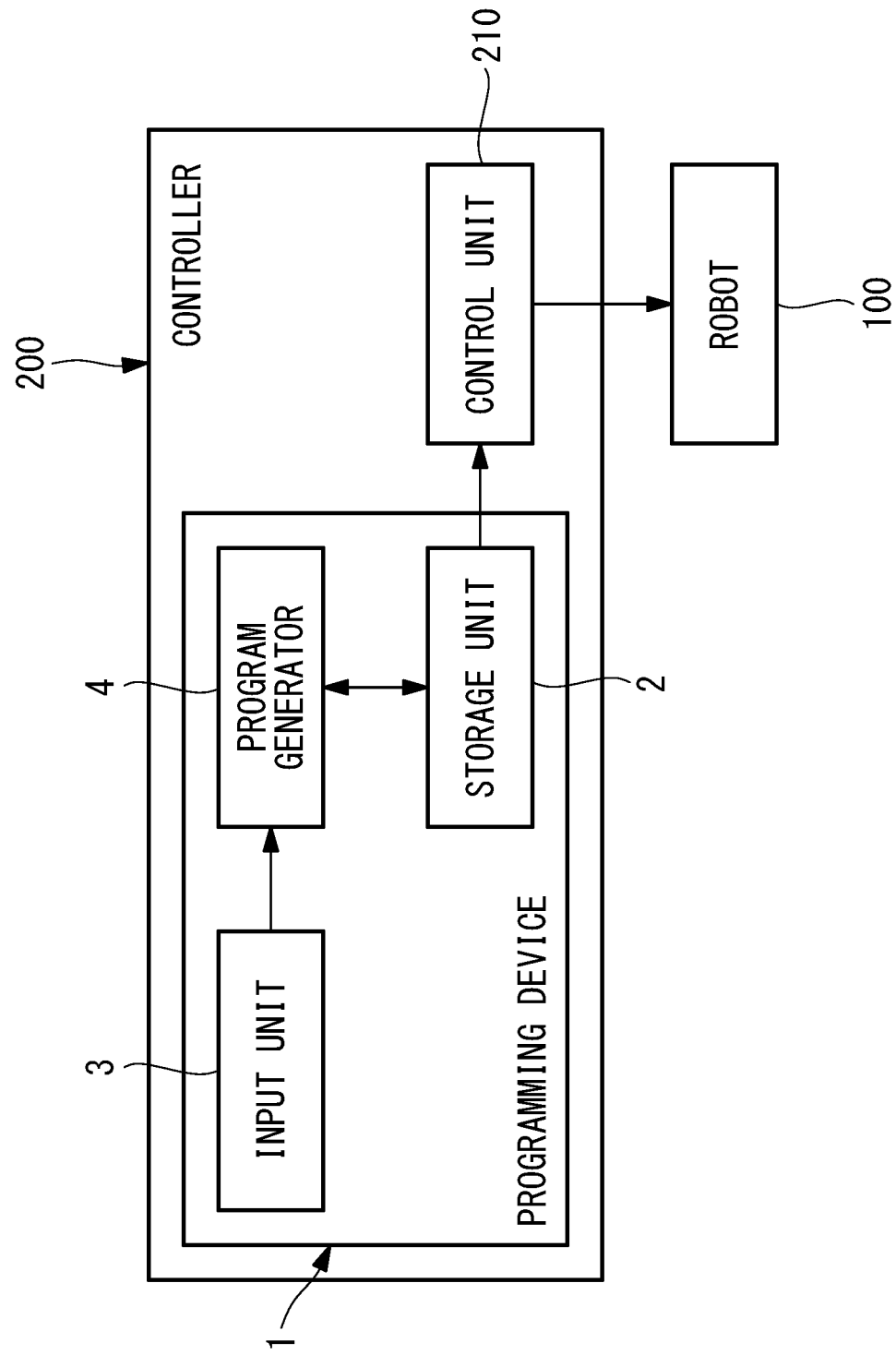
FIG. 1 is a block diagram showing a robot programming device according to an embodiment of the present disclosure.

As shown in FIG. 1, the programming device 1 for a robot 100 according to this embodiment is provided in, for example, a controller 200 for controlling the robot 100. The programming device 1 may be provided separately from the controller 200.

The programming device 1 includes a storage unit 2 that stores multiple types of programming blocks (programming elements) 10, 20, 30, and 40 (described below), an input unit 3 that accepts an operation by a user, and a program generator 4.

The storage unit 2 is a memory, and the input unit 3 is an input device, such as a keyboard, a mouse, or a touch screen.

The program generator 4 includes a processor and a monitor 5. The program generator 4 generates a control program by displaying the programming blocks 10, 20, 30, and 40 stored in the storage unit 2 on the monitor 5, and allowing a user to select and combine the programming blocks using the input unit 3.

Figure 2:
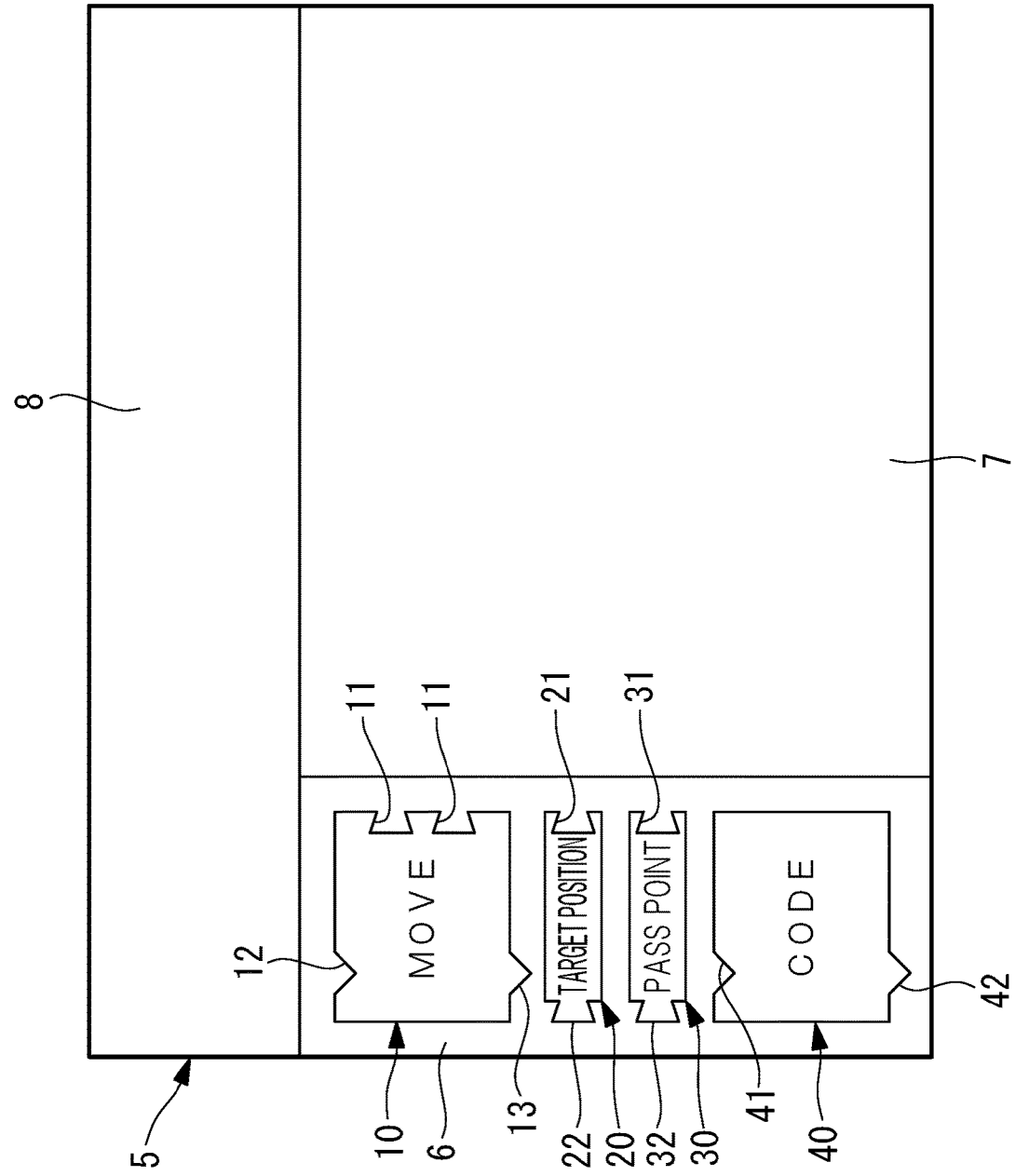
FIG. 2 shows an example display of a first section on a monitor of a program generator provided in the programming device in FIG. 1.

As shown in FIG. 2, the program generator 4 forms a first section (first display part) 6, a second section (second display part) 7, and a third section (third display part) 8 on the monitor 5. The programming blocks 10, 20, 30, and 40 stored in the storage unit 2 are displayed in the first section 6 in a manner selectable by using the input unit 3.

Figure 3:
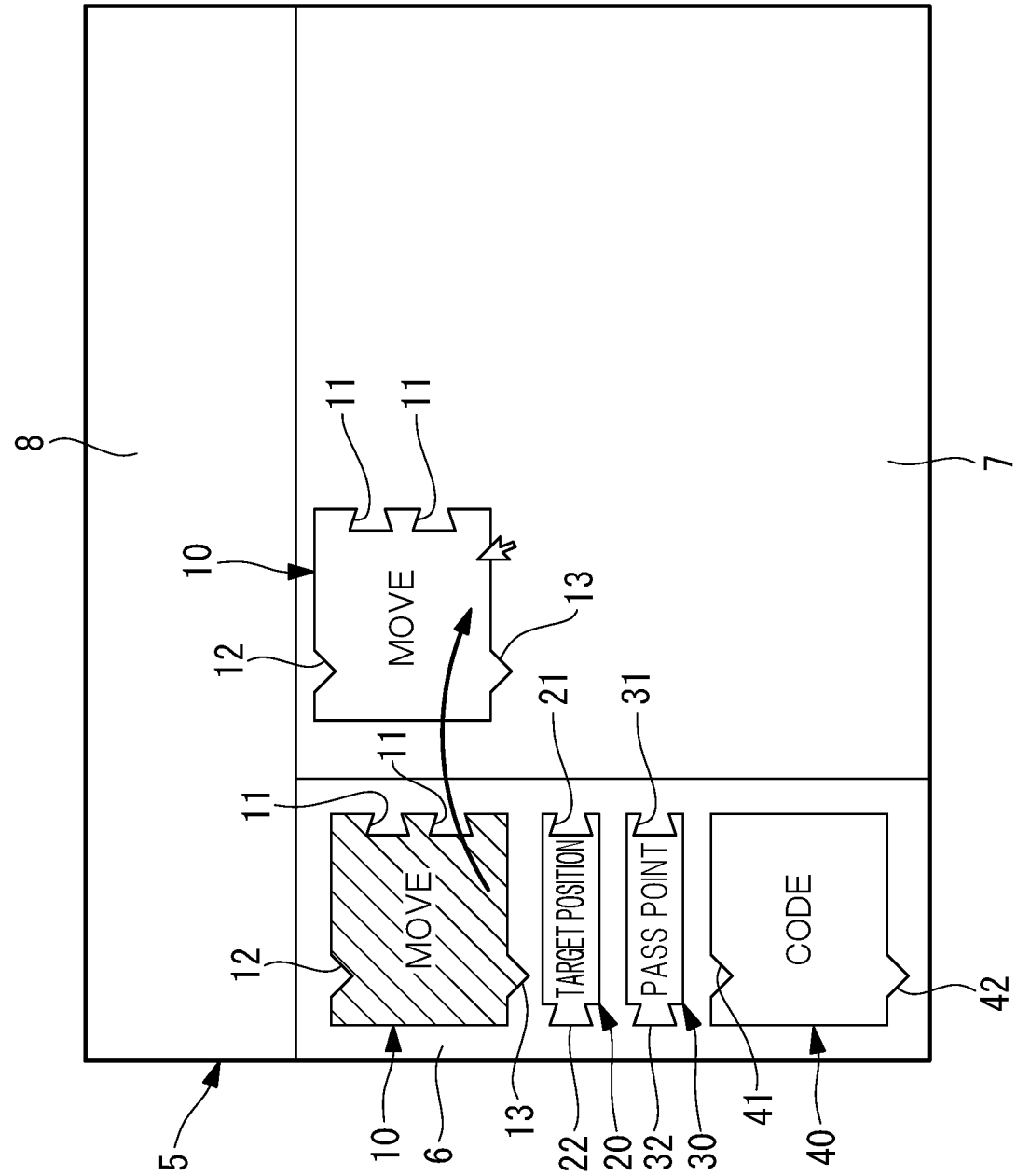
FIG. 3 shows an example display at the time when a MOVE block is dragged and dropped from the first section to a second section on the monitor of the program generator provided in the programming device in FIG. 1.

When the programming block 10 is selected from the programming blocks 10, 20, 30, and 40 displayed in the first section 6 with the input unit 3, e.g., a mouse, the selected programming block 10 (illustrated with hatching) is copied. The copied programming block 10 is held with the mouse and is disposed in the second section 7 by dragging and dropping, as shown in FIG. 3, so that the programming block 10 is combined with other programming blocks 20, 30, and 40 to constitute the control program.

Many of the programming elements are non-editable elements that graphically represent the functions constituting the control program for the robot 100, that have settable parameters, and that can achieve simple functions. For example, a MOVE block 10, which is one of the programming blocks, is an element for operating the robot 100 such that the TCP (tool center point) of the robot 100 moves to a target position.

Figure 4:
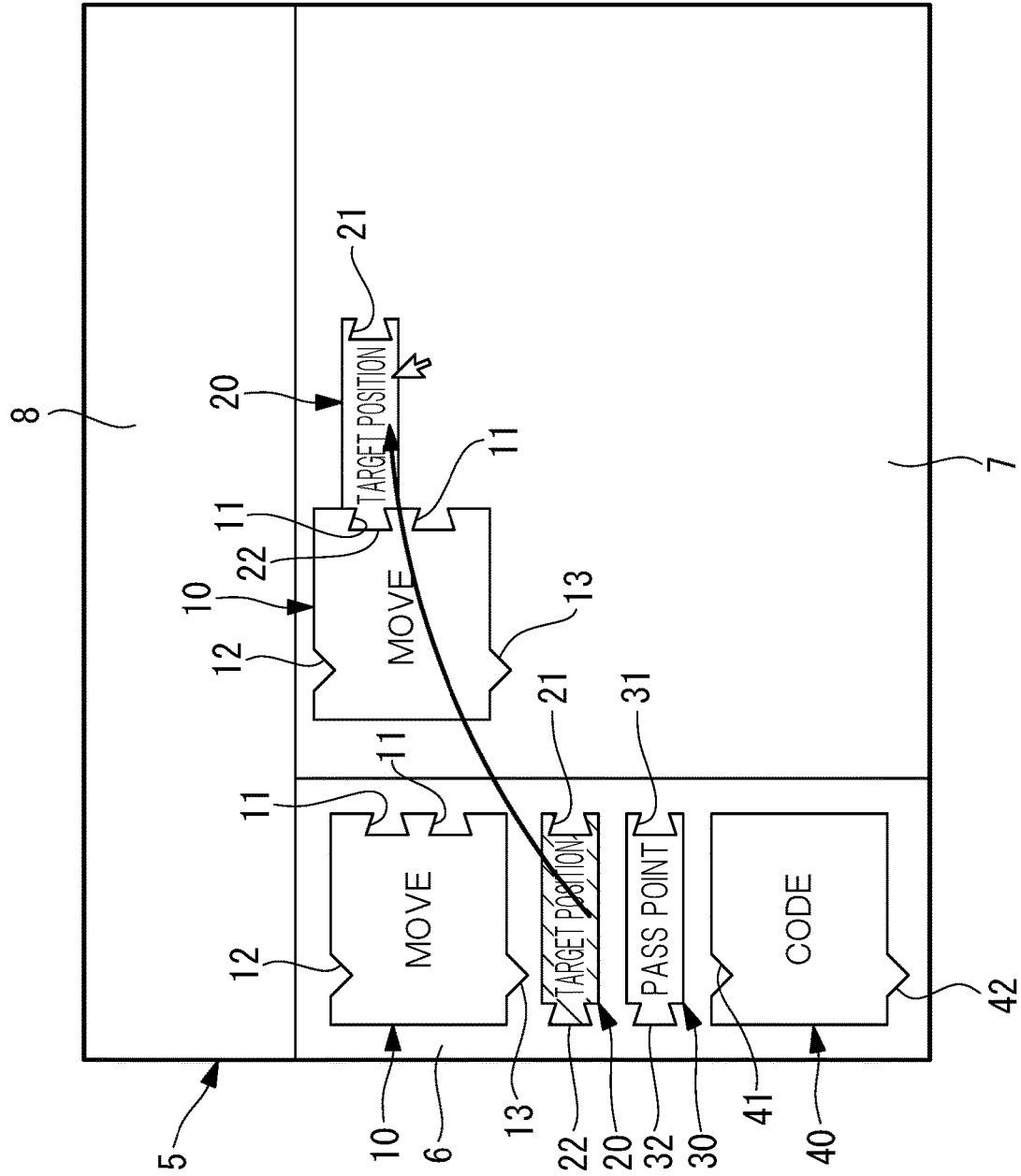
FIG. 4 shows an example display at the time when a target position block is dragged and dropped from the first section to the second section on the monitor in FIG. 3.

As shown in FIG. 4, the MOVE block 10 can be combined with, for example, other programming blocks, such as a target position block 20 and a pass point block 30, serving as parameters. The programming blocks 10, 20, 30, and 40 have connectors 11, 12, 13, 21, 22, 31, 32, 41, and 42 similar to the recesses and protrusions of jigsaw puzzle pieces, and the recessed connectors 11, 12, 21, 31, and 41 of the programming blocks 10, 20, 30, and 40 can be connected to the protruding connectors 13, 22, 32, and 42 of the other programming blocks 10, 20, 30, and 40.

When combined with the MOVE block 10, the target position block 20 sets a target position to which the TCP is moved by the MOVE block 10. When combined with the MOVE block 10 together with the target position block 20, the pass point block 30 sets a pass point via which the TCP is moved from the current position to the target position. The target position block 20 and the pass point block 30 can set position coordinates as the parameters.

In the programming device 1 for the robot 100 according to this embodiment, the programming blocks 10, 20, 30, and 40 include at least one editable programming block (editable programming element), in which the function constituting the control program can be edited with a character string input from the input unit 3. Similarly to the other programming blocks, the editable programming block is displayed in the first section 6. The editable program can be selected by using, for example, the mouse and disposed in the second section 7 by dragging and dropping.

Figure 5:
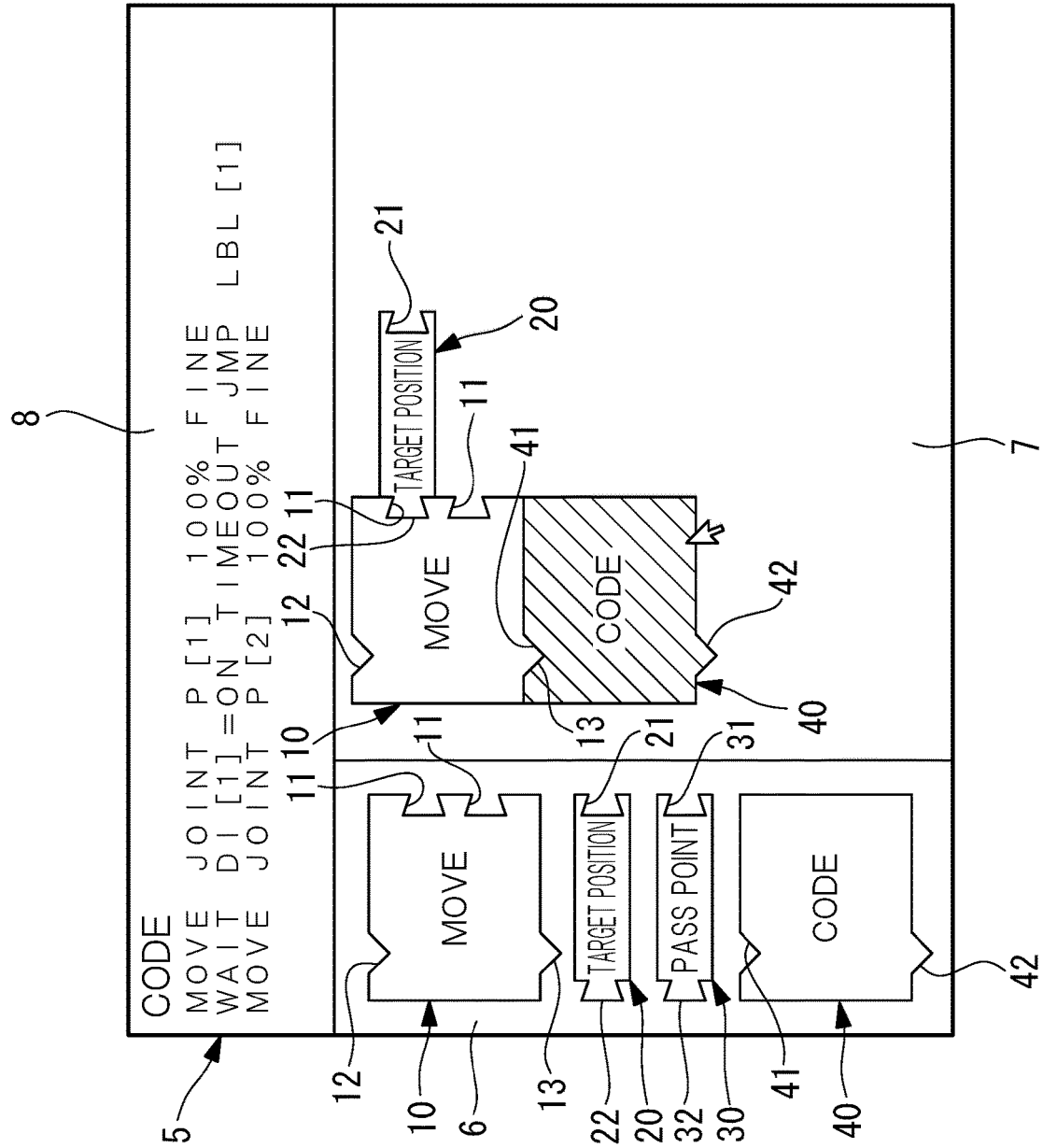
FIG. 5 shows an example display of the first to third sections in a state in which a CODE block disposed in the second section on the monitor in FIG. 2 is selected.

For example, as shown in FIG. 5, when the CODE block 40, which is one of the editable programming blocks, displayed in the first section 6 or the second section 7 in the monitor 5 is selected by using the input unit 3, the details thereof are displayed in a third section 8 in an editable manner.

Specifically, when an editable programming block is selected, the details thereof are displayed in the third section 8 on the monitor 5. When no details are registered in the editable programming block, the third section 8 is blank.

It is possible to write a complex command in the editable programming block. Examples of the complex command include an interpolation command and a conditionally branching command.

It is also possible to write multiple commands in the editable programming block. For example, it is possible to write multiple actions in one programming block.

A user can input the functions constituting the control program with character strings of a predetermined programming language by using the input unit 3, such as the keyboard. After the detail has been edited, the CODE block 40 is given a new name and is dragged and dropped to the first section 6. Thus, the CODE block 40 is registered as one of the programming blocks 10, 20, 30, and 40.

By repeating this operation, it is possible to generate a control program in the second section 7. The generated control program is stored in the storage unit 2. A control unit 210 provided in the controller 200 reads out the control program stored in the storage unit 2, generates an operation control signal, and outputs the signal to the robot 100.

With the thus-configured programming device 1 for the robot 100 according to this embodiment, it is possible to generate a control program simply by selecting programming blocks displayed in the first section 6 and arranging the selected programming blocks in the second section 7. By making the programming blocks 10, 20, 30, and 40 to be arranged include at least one editable programming block (herein, the CODE block 40), it is possible to add, to the control program, an advanced command that is difficult to express with a simple programming block, which is advantageous.

Although the programming blocks 10, 20, 30, and 40 graphically representing the functions constituting the control program for the robot 100 have been described as an example of the programming elements in this embodiment, icons may be used instead. By arranging the icons in accordance with a predetermined order, the icons may be used in the same way as the programming blocks 10, 20, 30, and 40.

Figure 6:
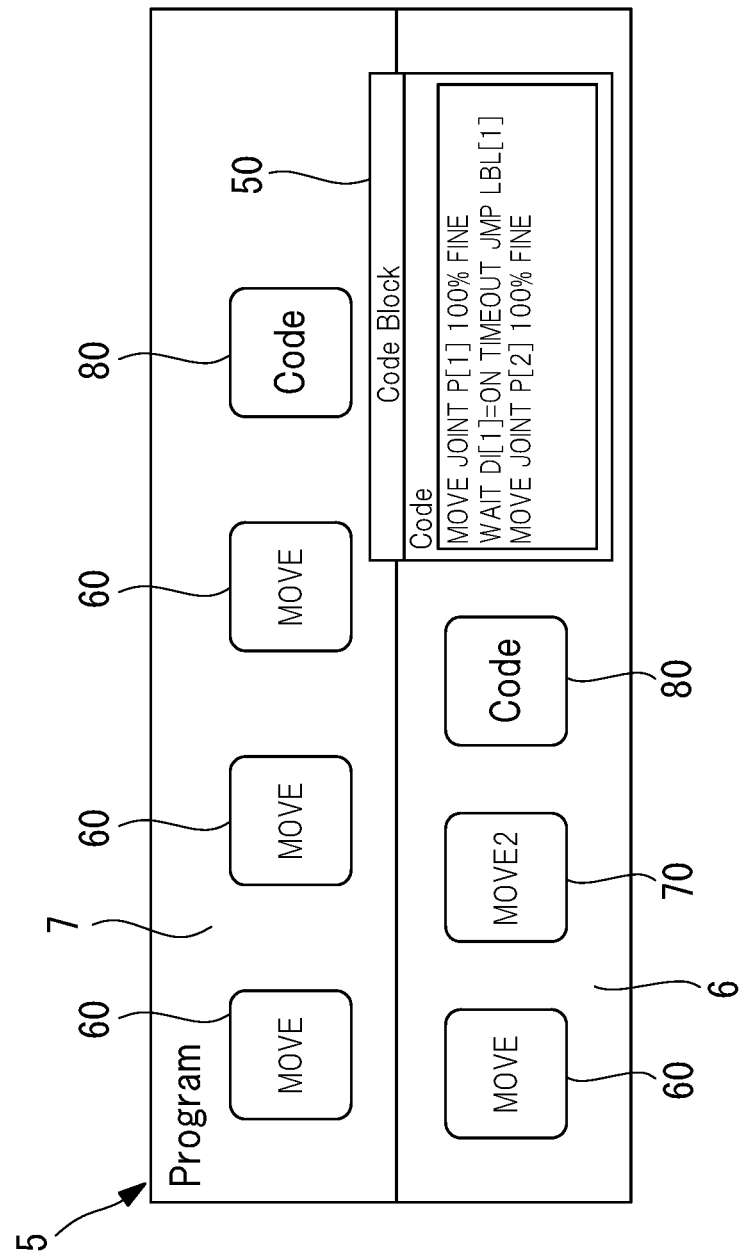
FIG. 6 shows a modification of the display on the monitor of the program generator provided in the programming device in FIG. 1.
Figure 7:
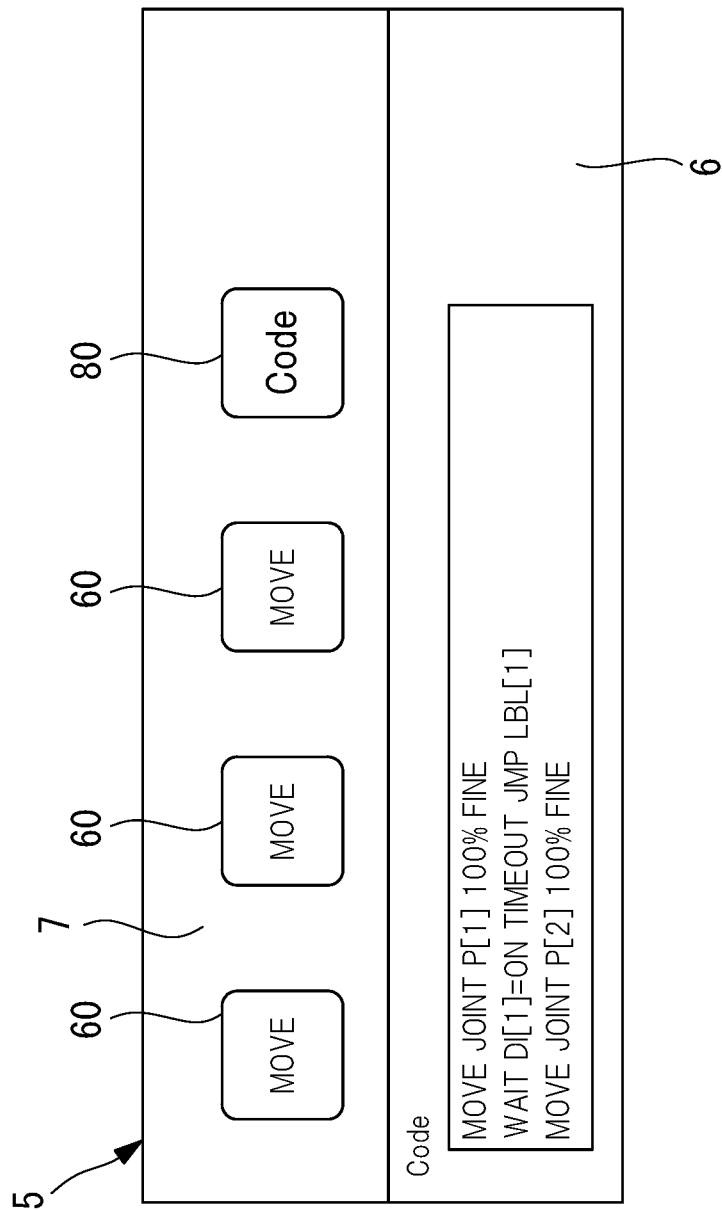
FIG. 7 shows another modification of the display on the monitor of the program generator provided in the programming device in FIG. 1.

More specifically, as shown in FIG. 6, from programming icons (icons) 60, 70, and 80 displayed in the first section 6 on the monitor 5, the programming icons 60 and 80 are selected by using the input unit 3 and are disposed in the second section 7. When the Code icon 80, which is an editable programming icon (editable programming element), is selected, a window (third display part) 50 showing the detail of the selected Code icon 80 is displayed as a pop-up window. Alternatively, as shown in FIG. 7, it is possible to configure the device such that, when the Code icon 80, which is an editable programming icon, disposed in the second section 7 is selected, the Code icon 80 is shown in an enlarged manner in an area of the first section 6.

Figure 8:
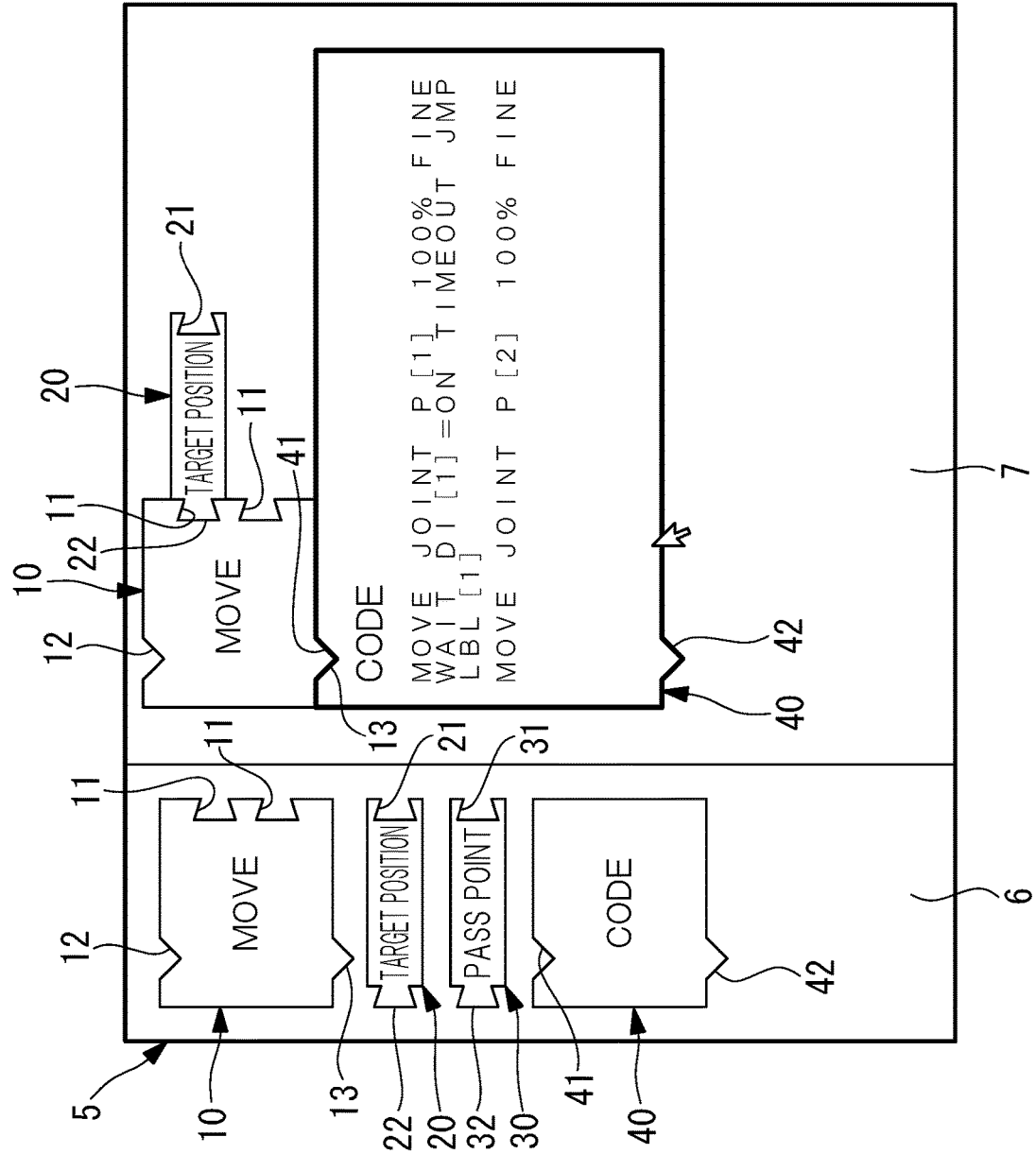
FIG. 8 shows a modification of the display in FIG. 5.

In this embodiment, besides the first section 6, in which the programming blocks 10, 20, 30, and 40 are arranged, and the second section 7, in which the control program is generated, the third section 8 is formed on the monitor 5, and the details of an editable programming block selected are displayed therein. Instead, as shown in FIG. 8, when the CODE block 40, which is an editable programming block, is selected, a window (third display part) showing the details of the selected editable programming block, i.e., the CODE block 40, in an enlarged manner may be formed within the second section 7. The selected programming block 40 is illustrated with a thick line.

Figure 9:
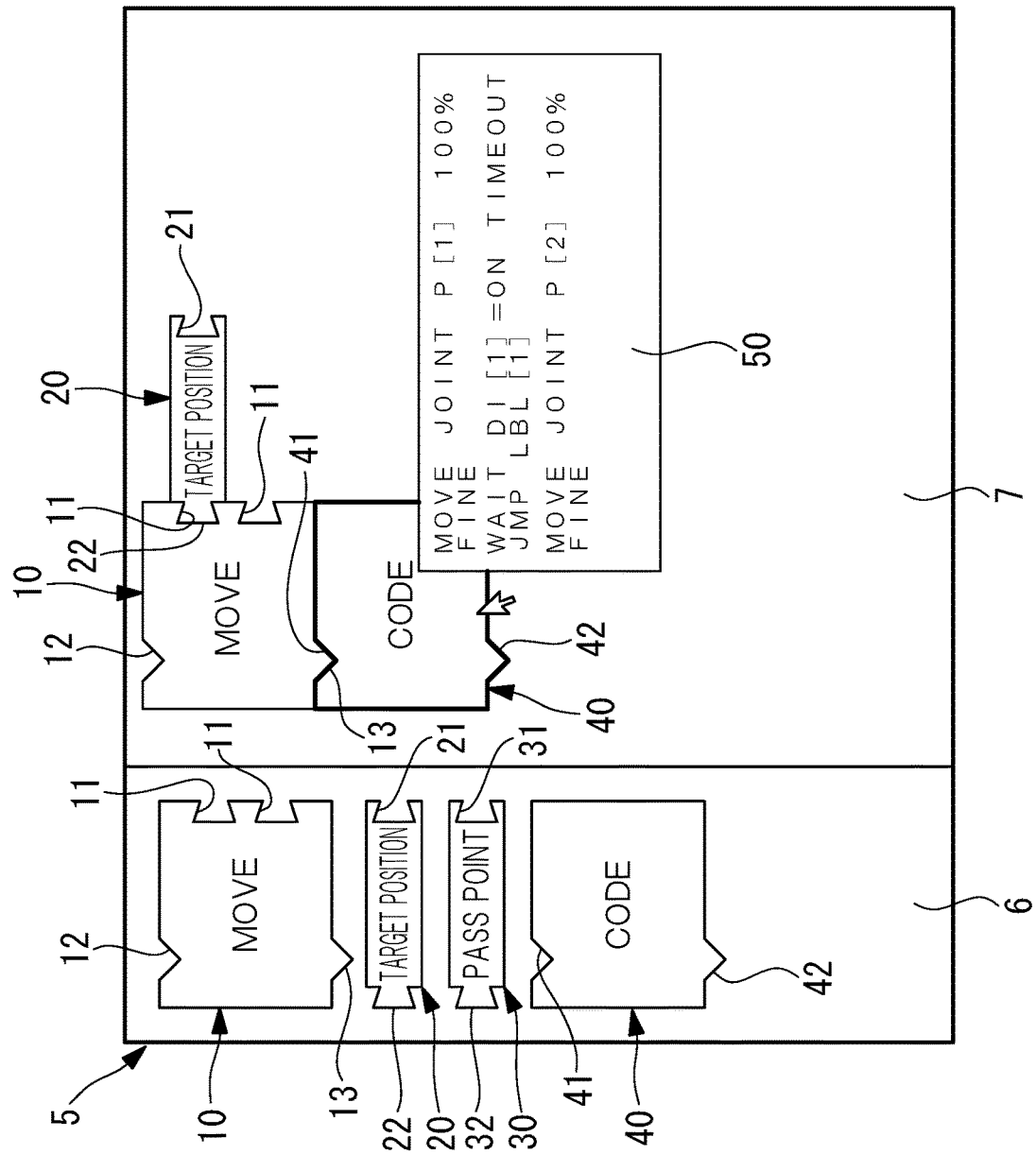
FIG. 9 shows another modification of the display in FIG. 5.

As shown in FIG. 9, it is also possible to configure the device such that, when the editable programming block 40 is selected, a window (third display part) 50 showing the detail of the selected editable programming block 40 is displayed as a pop-up window near the programming block 40. By using enlarged display of the editable programming block 40 or the pop-up display of the window 50, the need to provide the third section 8 on the monitor 5 is eliminated. Thus, it is possible to allocate wide display areas for the first section 6 and the second section 7.

Figure 10:
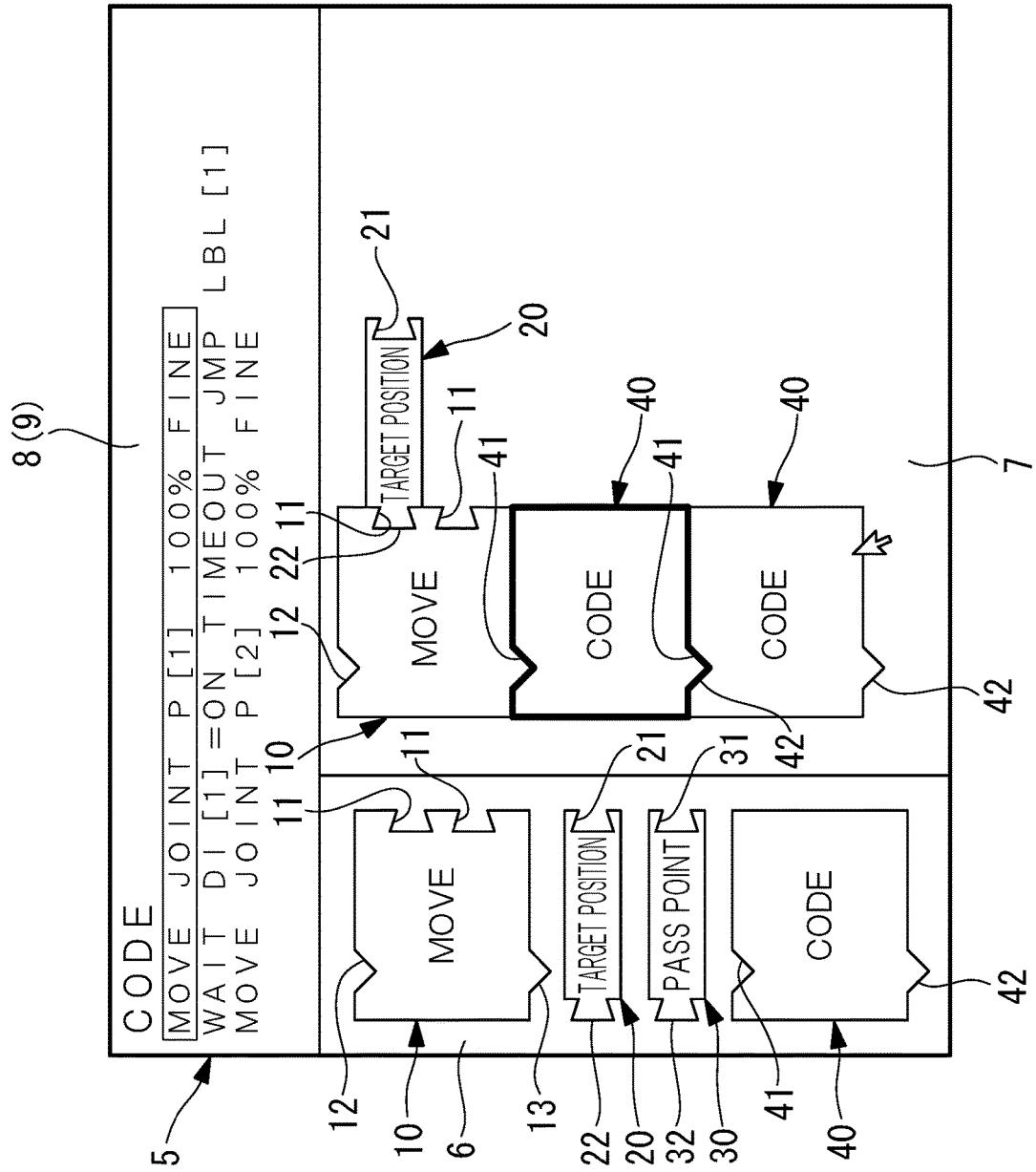
FIG. 10 shows an example display on the monitor during execution of the control program generated by the programming device in FIG. 1.

Furthermore, as shown in FIG. 10, it is also possible to configure the device such that, when the generated control program is executed, among the multiple programming blocks 10 and 40 arranged in the second section 7, the programming block 40 that is being executed is displayed in a different display style such that it can be distinguished from the other programming blocks 10 and 40. Examples of the distinguishable indication style include a highlighted indication, an underlined indication, a framed indication, and indication with a different color.

When the programming block 40 that is being executed is an editable programming block, a fourth section (fourth display part) 9 for showing the details of the editable programming block 40 may be provided. Although FIG. 10 shows a case where the fourth section 9 and the third section 8 share a common section, the fourth section 9 and the third section 8 may be provided separately.

Furthermore, as shown in FIG. 10, while the editable programming block 40 is executed, the command that is being executed may be displayed in a manner distinguishable from the other commands in the details indicated in the fourth section 9.

This allows a user to visually recognize the programming block 40 and/or the command that are being executed.

The invention claimed is:

1. A robot programming device comprising:
  a storage unit configured to store program-constituting elements, the program-constituting elements including two or more types of programming elements, a target position block, and a passing point block, each of which is to be displayed on a display device, the program-constituting elements constituting a control program for a robot;
  an input unit configured to receive an operation by a user; and
  a program generator configured to generate the control program when the programming elements, the target position block, and the passing point block stored in the storage unit are selected and arranged on the display device by using the input unit, wherein
  at least one of the programming elements is an editable programming element in which the function can be edited by characters, which are at least a part of a character string as a part of a string of commands for moving the robot, input by using the input unit,
  at least another one of the programing elements is a move programing element for moving a tool center point, and
  the robot programming device is configured to generate the control program including a control command which causes the tool center point to move to a target position indicated by the target position block via a passing point indicated by the passing point block in a case in which the target position block and the passing point block are combined with the move programing element on the display device.

2. The robot programming device according to claim 1, wherein the program generator includes: a first display part for showing the programming elements stored in the storage unit in a manner selectable with the input unit; a second display part for showing and arranging copies of programming elements selected from the programming elements shown in the first display part in a manner selectable with the input unit; and a third display part for showing, when the editable programming element is selected from the programming elements arranged in the first display part or the second display part, the string of commands of the editable programming element in a manner editable with the input unit,
  wherein the program generator is configured to change the string of commands shown in the third display part by the characters input by using the input unit.

3. The robot programming device according to claim 2, wherein the third display part is created within the selected editable programming element.

4. The robot programming device according to claim 2, wherein the third display part is displayed as a pop-up window near the selected editable programming element.

5. The robot programming device according to claim 2, wherein, when the control program generated by the program generator is executed, an executed programming element that is being executed, among the programming elements arranged in the second display part, is indicated in a manner distinguishable from remaining programming elements.

6. The robot programming device according to claim 5, further comprising a fourth display part in which, when the executed programming element that is being executed is an editable programming element, details of the editable programming element are displayed.

7. The robot programming device according to claim 6, wherein, when the editable programming element is being executed, a command that is being executed is indicated in a manner distinguishable from remaining commands in the details indicated in the fourth display part.

* * * * *